S. O. JOY.
HARROW.
APPLICATION FILED DEC. 3, 1913.
1,118,288.
Patented Nov. 24, 1914.
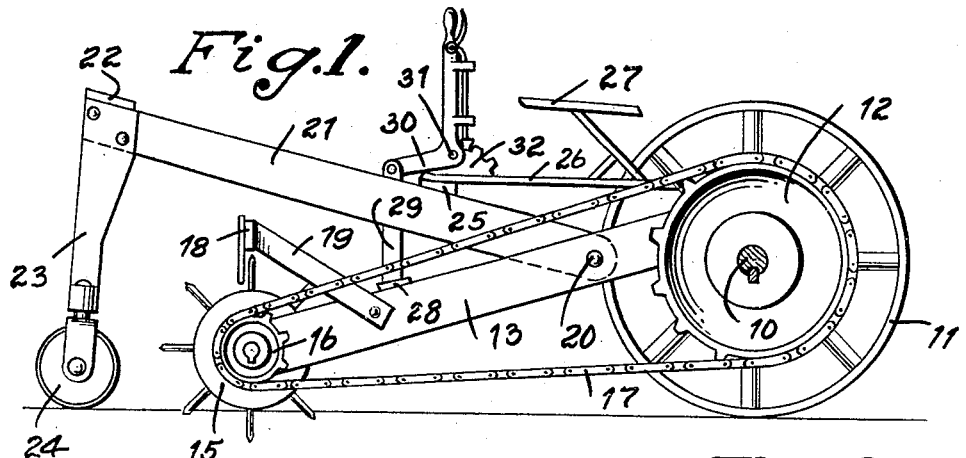
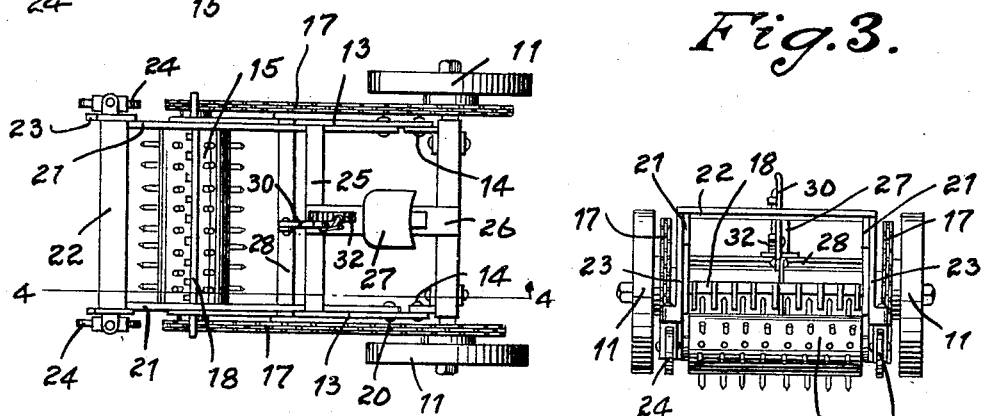
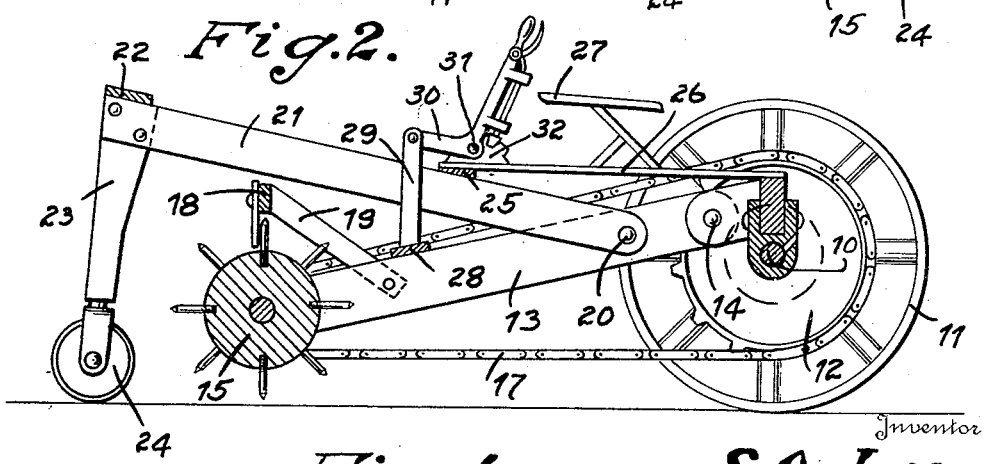
Witnesses
M. S. Watson
Francis Boyle
Inventor
S. O. Joy
By Chandler & Chandler
Attorneys

UNITED STATES PATENT OFFICE.

SAMUEL O. JOY, OF TIVERTON, RHODE ISLAND.

HARROW.

1,118,288.  Specification of Letters Patent.  Patented Nov. 24, 1914.

Application filed December 3, 1913. Serial No. 804,441.

*To all whom it may concern:*

Be it known that I, SAMUEL O. JOY, a citizen of the United States, residing at Tiverton, in the county of Newport, State of Rhode Island, have invented certain new and useful Improvements in Harrows; and I do hereby declare the following to be a full, clear, and exact description of the invention, such as will enable others skilled in the art to which it appertains to make and use the same.

This invention relates to harrows and has for an object to provide a harrow having a spike roller which will be simultaneously rotated and forced into the ground upon advance of the harrow whereby the ground will be thoroughly broken up.

A further object of the invention is to provide a novel gage frame and roller carrying frame, such frames being so secured that the weight of both to a great extent is disposed on the roller so that the latter is firmly forced against the ground.

A further object is to provide a harrow which will be formed of a few strong and durable parts that may be manufactured at a minimum cost and will not easily get out of order.

With the above objects in view the invention consists of certain novel details of construction and combination of parts hereinafter fully described and claimed, it being understood that various modifications may be made in the minor details of construction within the scope of the appended claims.

In the accompanying drawing illustrating this invention:—Figure 1 is a side elevation of the harrow with the near wheel removed. Fig. 2 is a plan view of the harrow. Fig. 3 is a rear elevation. Fig. 4 is a longitudinal sectional view taken on the line 4—4 Fig. 2.

Referring now to the drawing, in which like characters of reference designate similar parts, 10 designates an axle, the same having ground wheels 11 fixed to their ends, which ground wheels carry respective sprockets 12. A pair of downwardly inclined frame bars 13 are pivoted at the forward ends as shown at 14 to the axle, and carry at their lower ends a spiked roller 15, the ends of the shaft of the roller being equipped with small sprockets 16 over which and the ground wheel sprockets 12, sprocket chains 17 are trained. It is thus evident that upon advance of the harrow the roller will be rotated by these chain drives from the ground wheels. A toothed cleaning bar 18 is arranged above the roller and is secured to the roller frame bars 13 by braces 19, the teeth of this bar cleaning the roller teeth during rotation of the roller.

Pivotally connected at their forward ends as shown at 20 to the roller frame bars 13 are substantially horizontally disposed frame bars 21 which are connected at their outer ends by a cross bar 22 and carry at their outer ends depending hangers 23 which are equipped with gage wheels 24 that ride on the ground in rear of the spiked roller. A cross bar 25 connects the frame bars 21 in front of the spiked roller, this cross bar loosely supporting one end of a longitudinal bar 26 which is secured at the opposite end to the axle, this longitudinal bar supporting the operator's seat 27. A cross bar 28 connects the toothed roller frame bars 13 and to the center of the cross bar is pivotally secured an upright link 29 which in turn is secured to an angular handle lever 30 which is pivoted as shown at 31 on a notched segment plate 32 carried by the longitudinal bar 26, the lever being equipped with a latch operated pawl which operatively engages the notched segment plate.

It is now clear that the frame bars 21 are pivoted upon the harrow roller bars 13 which latter in turn are pivoted on the axle. Therefore, the weight of the frame bars 21 as well as the operator's weight is to a great extent borne by the harrow roller bars 13 whereby the harrow roller is pressed down firmly into the ground so that during its rotation it will thoroughly break up the ground. The operating lever may be pulled forwardly by the operator to raise the harrow roller 15 from the ground when desired, the frame bars 21 serving as a fulcrum for the bars 13 during such movement.

From the above description it will be seen that I have provided an extremely simple and strong harrow that will effectively operate to break up the soil, and that may be drawn by an engine or by draft animals without sacrificing any of its advantages.

What is claimed is:

1. A harrow including an axle having fixed wheels, bars pivoted to the axle and extending backwardly therefrom, a toothed roller carried by said bars, means operatively connecting the roller for rotation with the wheels of said axle, frame bars, pivoted at their forward ends to the first named bars and extending rearwardly beyond the first named bars, ground engaging supports on said frame bars, and a lever having its support resting on said frame bars and operatively connected with the said first named bars for raising and lowering the rollers.

2. A harrow including an axle having fixed wheels, bars pivoted on said axle and extending forwardly and downwardly therefrom, a toothed ground penetrating roller carried by said bars, means operatively connecting said roller for rotation with the wheels of said axle, frame bars pivoted at their rear ends to the first named bars and extending substantially horizontally and rearwardly beyond the first named bars, ground engaging wheels on the free ends of said frame bars, and a lever having its support resting on said frame bars and operatively connected with the first named bars for raising and lowering said rollers, the weight of said frame bars as well as the weight of the first named bars being to a great extent borne by said roller whereby said roller is forced into the ground.

In testimony whereof, I affix my signature, in the presence of two witnesses.

SAMUEL O. JOY.

Witnesses:
I. D. HUMPHREY,
IRA W. HUMPHREY.

Copies of this patent may be obtained for five cents each, by addressing the "Commissioner of Patents, Washington, D. C."